United States Patent [19]

Fincher

[11] Patent Number: 4,851,755
[45] Date of Patent: Jul. 25, 1989

[54] LOW POWER STEPPER MOTOR DRIVE SYSTEM AND METHOD

[75] Inventor: Jeffrey L. Fincher, San Bruno, Calif.

[73] Assignee: Ampex Corporation, Redwood City, Calif.

[21] Appl. No.: 162,439

[22] Filed: Mar. 1, 1988

[51] Int. Cl.[4] .............................................. H02P 8/00
[52] U.S. Cl. ................... 318/696; 318/685; 368/157
[58] Field of Search ................ 318/696, 685; 368/157

[56] References Cited

U.S. PATENT DOCUMENTS

| | | | |
|---|---|---|---|
| 3,368,128 | 2/1968 | Parrish | 318/138 |
| 3,577,176 | 5/1971 | Lawler | 318/432 |
| 4,027,215 | 5/1977 | Isaacson | 318/341 |
| 4,035,708 | 7/1977 | Schaff | 318/696 |
| 4,054,820 | 10/1977 | Foster | 318/345 |
| 4,129,810 | 12/1978 | Harshberger | 318/317 |
| 4,192,131 | 3/1980 | Hosokawa et al. | 368/157 |
| 4,275,343 | 6/1981 | Curtiss | 318/721 |
| 4,282,471 | 8/1981 | Budniak et al. | 318/685 |
| 4,319,174 | 3/1982 | Cook et al. | 318/696 |
| 4,422,040 | 12/1983 | Ward | 324/158 |
| 4,460,282 | 7/1984 | Konno | 368/157 |
| 4,511,829 | 4/1985 | Wisniewski | 318/317 |
| 4,551,665 | 11/1985 | Antoguini et al. | 318/696 |
| 4,715,725 | 12/1987 | Kawamura | 368/157 |

Primary Examiner—William M. Shoop, Jr.
Assistant Examiner—Saul M. Bergmann
Attorney, Agent, or Firm—Elizabeth E. Strnad; Richard P. Lange

[57] ABSTRACT

A system and method for driving a stepper motor utilizing a near minimum amount of driving power is described. A stepping detector is utilized to determine whether the motor has actually stepped in response to a driving power applied thereto. When it is determined that the motor has stepped, the magnitude of the driving power is decreased. When the stepping detector indicates a stall condition, the driving power is increased. As a result, the motor operates near stall condition and power consumption is minimized. In the preferred embodiment during each consecutive step a different phase of the motor is deenergized to conserve power. By stepping the motor a voltage pulse is induced into the deenergized phase. The polarity and magnitude of that voltage pulse are examined after each step to determine whether the motor has actually stepped. The use of the deenergized phase to ascertain motor status eliminates the need for an external stepping detector.

16 Claims, 8 Drawing Sheets

LOW POWER STEPPER MOTOR DRIVE SYSTEM AND METHOD

The invention described herein was made in the course of Contract No. 85*I176380*000 awarded by the United States Government.

The invention relates to a motor drive system utilizing a near minimum amount of power necessary to drive a stepper motor.

BACKGROUND OF THE INVENTION

Stepper motors are known to provide discrete angular motions of uniform magnitude, generally referred to as steps, rather than continuous rotation. Stepper motors are commonly utilized in printers, computer disk drives and other applications where it is necessary to move an element, such as printer head or magnetic transducer, to a predetermined position. When a predetermined current in the form of a motor drive pulse is applied to the stepper motor driver, it is assumed that the motor will rotate by one step to its next position, also referred to as null position, or detent. Enough power must be applied for each step to overcome the opposing torques present in the motor and the motor load. The motor is driven in such a way that after each step the polarity of the flux through the phases changes, thereby rotating the rotor to the next null position where it remains until the next flux change. The sequence in which the polarity for driving each phase changes may differ for each particular stepper motor type, and is prescribed by a phase driving timing diagram associated with each motor. Generally there may be about 100 steps per revolution, or less, depending on the number of magnetic poles. The rate of steps per unit of time is determined by the desired rate of rotation of the motor, or motor speed. The driving current necessary for each step is determined by the required load torque. Thus increasing the step current does not increase the rotational rate of the motor, nor does increasing the step rate increase the motor torque. Position sensors generally are not utilized with stepper motors to indicate the actual position of the rotor during operation. Such position sensors would normally indicate whether the rotor has actually moved after a drive pulse has been applied. Therefore, in stepper motors it is a general practice to apply a drive current of a somewhat greater magnitude than necessary to assure that the motor will make the required step in response to each motor drive pulse.

However, in applications where low power consumption is an important factor, it is desirable to apply only a required amount of drive current. It is also desirable to change the drive current with varying load conditions, while the step rate and step current must be controlled independently, so that a minimum amount of drive current may be maintained with changing operating conditions.

SUMMARY OF THE INVENTION

The present invention provides a stepper motor drive system and method utilizing near minimum power. A stepping detector is utilized to ascertain whether the motor has stepped to assume a next null position, in response to a driving power applied to the motor. In case stepping is detected, the driving power to be applied for the next step is reduced. However, when stall condition is detected, the driving power is increased.

In accordance with a further embodiment of the invention, one phase of a multiple phase stator winding is in a deenergized condition during each step, that is, there is no driving current applied to that phase. Different phases of the motor are alternately deenergized during consecutive steps. During each step a back electromagnetic force (EMF) in form of a voltage pulse is induced by the motion of the rotor into the deenergized phase of the stator. However, in some instances when the rotor has not actually stepped, a voltage pulse may be induced, as a result of disturbances, for example by jerking of the rotor back and forth, vibration, noise, or crosstalk induced from an energized phase into the deenergized phase. To distinguish between pulses induced by actual stepping of the rotor, and pulses induced as a result of various disturbances, a pulse detection/discrimination circuit is utilized. It detects the amplitude and polarity of the induced pulse, and determines whether the obtained pulse indicates actual motor movement. When it is determined that the motor has actually stepped in the predetermined direction, an output signal of a first logic level is provided by the pulse detector/discriminator. When an actual step movement is not detected, then a second logic level signal is provided. In the preferred embodiment a selected number of consecutive output signals provided by the pulse detection/discrimination circuit is considered to determine running or stall condition of the motor. By considering a larger number of consecutive output signals, rather than just one signal at a time, induced pulses which may have the correct amplitude and polarity, but result from various disturbances are eliminated from consideration. Because of the change in polarity of the subsequent energizing pulses applied to the motor, it is unlikely that a plurality of such disturbing pulses of the correct polarity will appear in sequence.

When the output signal provided by the pulse detector/discriminator indicates that the motor is in running condition, the driving power is decreased by a predetermined amount after each such detection. When one or more of the predetermined number of consecutive pulses, which are being considered at a time, does not result from actual stepping, it is assumed that the motor is stalled. After each such detection the driving power is increased by a predetermined amount, until all the considered consecutive pulses indicate actual rotor movement, whereafter the driving power is again decreased. It is seen from the foregoing description that the motor operates at a near minimum power level necessary to obtain movement in a desired direction of rotation, but near stall condition.

In addition to the foregoing advantage of reducing the driving power, the system of the preferred embodiment has an additional advantage of eliminating the need for external stepping detectors, such as conventional position sensors, for example tachometers, or optical sensors. Power consumption is thereby further reduced.

The preferred embodiment of the invention utilizes a two phase stepper motor whose phases are alternately energized, that is, only one phase is energized at any particular time. In this embodiment power consumption is reduced by 50 per cent, while the useful torque is reduced by only 30 per cent. As a result, the motor is operated more efficiently than it would be when both phases are energized.

As an example, the stepper motor in accordance with the herein described system of the preferred embodiment is utilized to drive the reels carrying magnetic tape in a magnetic recording/reproducing device. In this particular application the reels turn at a very slow rate, in the order of one revolution per minute, and they represent a significant amount of mass. The motor is driven through a reduction gear drive which multiplies the motor torque to drive the reels. As it is well known in the art, when utilizing reduction gearing, only a fraction of the motor torque is needed to obtain one revolution of the input shaft, while a much higher torque is obtained on the output shaft. Stepper motors are known to have a detent torque which holds the motor in a steady state when there is no driving power applied thereto. The detent torque is used in this application to maintain the tape tension unchanged when the reel motor is in the off state. The detent torque in the stepper motor is multiplied by the reduction gear drive to hold the reels in place in the off condition of the motor, thereby maintaining the desired tape tension.

DETAILED DESCRIPTION

Figure 1:
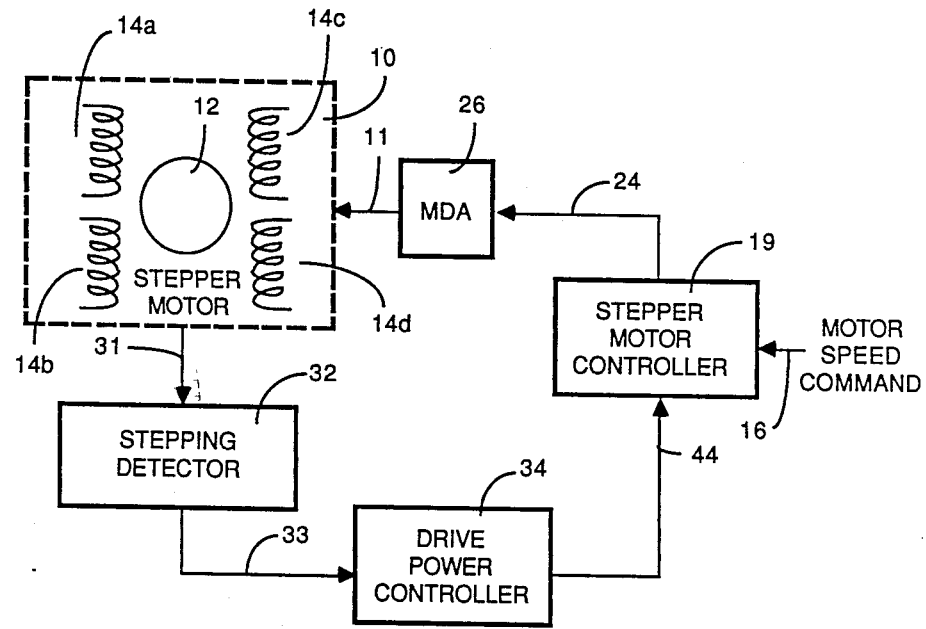
FIG. 1 is a simplified block diagram of a multiple phase stepper motor drive system of the present invention.

FIG. 1 shows a stepper motor 10 utilized for example in a reel servo of a magnetic tape recording/reproducing device (not shown), in a system application where the reel is driven at very low speeds and the servo must consume minimum power. As it is well known from the art of magnetic tape recording and playback, a conventional reel servo receives a position command signal corresponding to a desired position of a tension arm, and a negative feedback position signal, corresponding to its actual position. The servo provides an error signal corresponding to a difference between these two signals, and it applies a motor speed command signal to accelerate or decelerate the reel until the position error signal becomes zero. By rotating the reel faster or slower, the position of the tension arm changes, thereby providing a tighter or looser tape tension on the reel, until a desired tape tension is obtained, which corresponds to the desired tension arm position. Thus the position of the tension arm is servoed by controlling the rotation of the reel.

With further reference to FIG. 1, a multiphase stepper motor 10 is shown having a rotating magnet rotor 12 and a number of stator windings, or phases, for example four phases 14a to 14d. These phases are energized in a conventional manner by applying a drive current via line 11 from a motor drive amplifier (MDA) 26. A motor speed command signal is received via line 16 from a conventional reel servo (not shown). Typically that signal is derived from the position of a tension arm (not shown) utilized to maintain constant tape tension, as it is well known in the art of magnetic tape recording and playback. Depending on the polarity and magnitude of the motor speed command signal, the speed of rotation of the tape reel is increased or decreased, as it may be necessary to maintain constant tape tension.

In accordance with the present invention, a stepping detector 32 is coupled to detect actual stepping of the motor 10, in response to a drive current applied from the MDA 26 to the motor via line 11. The stepping detector may be implemented for example by a conventional tachometer or optical sensor, which detect a change in the position of the rotor 12. The detector outputs a control signal on line 33 indicating whether the motor has actually stepped, or whether it is stalled. A drive power controller 34, for example an up/down counter, receives an output signal from the detector 32 via line 33. When running condition of the motor is detected, the signal on line 33 causes the drive power controller 34 to decrease the magnitude of a power command signal provided thereby on line 44. On the other hand, when stall condition is detected, the magnitude of the power command signal on line 44 is increased in response to the control signal on line 33. The power command signal on line 44 is applied to a stepper motor controller 19, which also receives the previously mentioned motor speed command signal on line 16. In response to its respective input signals on lines 16 and 44, the controller 19 applies switching pulses on line 24 to MDA 26. These switching pulses have a frequency of switching determined by the motor speed command signal on line 16, and a magnitude determined by the power command signal on line 44. In response to the switching pulses received on line 24 the MDA 26 applies drive pulses to the windings 14a to 14d in a correct sequence and at a correct polarity, in accordance with a particular phase driving timing diagram utilized for the particular stepper motor 10.

It is seen from the foregoing description with reference to FIG. 1 that the stepper motor is energized using a minimum power necessary for stepping and near stall condition.

To facilitate comparison between the various embodiments of the invention, like circuit elements are designated by like reference numerals in all the drawing Figures. Because of the similarities between the various embodiments, features which have been previously described with respect to one embodiment will not be repeated with respect to further embodiments to avoid undue repetition.

Figure 2:
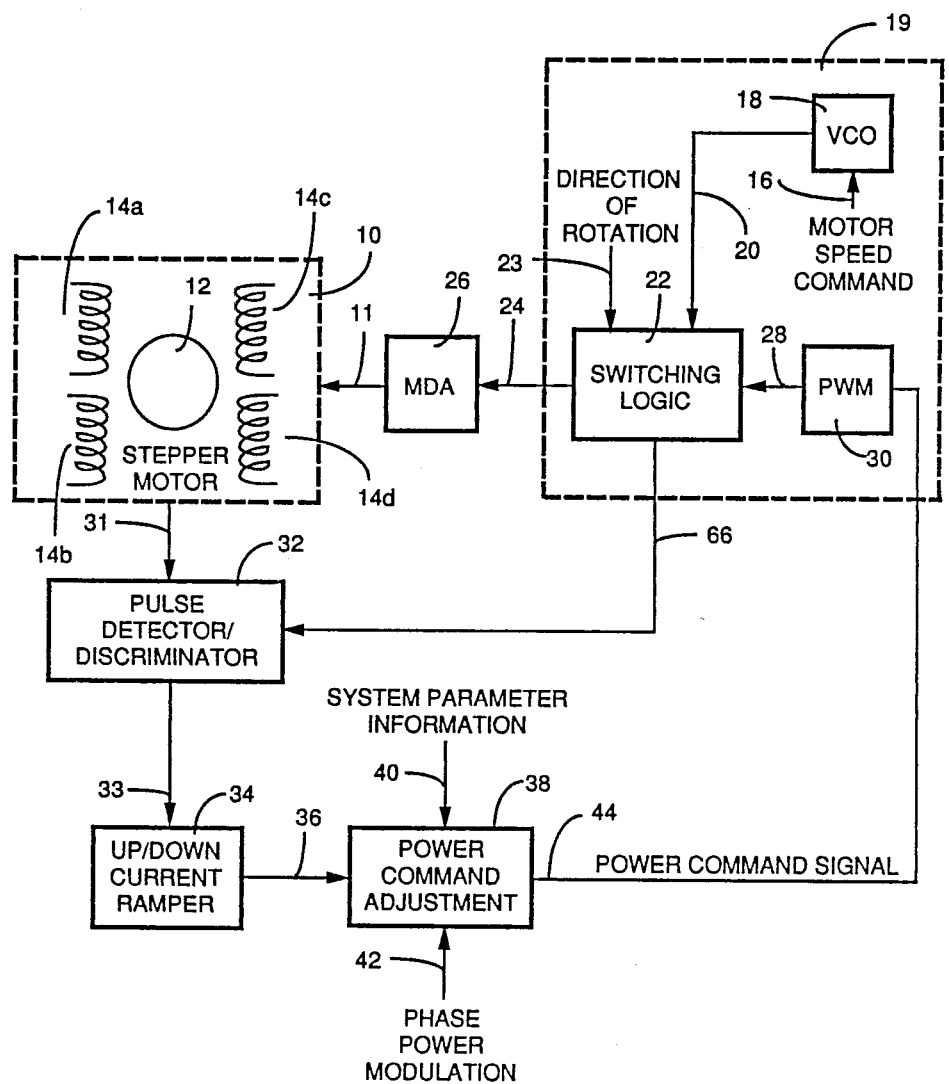
FIG. 2 is a simplified block diagram of a multiple phase stepper motor drive system in accordance with a further embodiment of the present invention.

Now a further embodiment of the invention will be described with reference to FIG. 2. In addition to the above-described features with reference to FIG. 1, the embodiment of FIG. 2 includes a further important feature of the invention, that a different phase of the stepping motor is deenergized during each consecutive step. In FIG. 2 the stepper motor controller 19 has a voltage controlled oscillator (VCO) 18, a pulse width modulator (PWM) 30, and a switching logic circuit 22. The command signal on line 16 is applied to the VCO 18 whose output signal frequency is increased or decreased in response to an increasing or decreasing motor speed command. The output signal from the VCO 18 controls the speed of motor rotation by controlling the frequency of motor drive pulses, as it will follow from further description. The output signal from the VCO 18 is applied via line 20 to a switching logic circuit 22. Circuit 22 receives via line 28 motor drive pulses from a conventional pulse width modulator 30. The switching logic circuit 22 is utilized to switch on/off the respective phases 14a to 14d of the stepper motor 10, and to switch the polarity of the drive pulse received on line 28, after each step, as it is necessary to energize these respective windings to obtain a desired rotation by the tape reel (not shown) driven by the motor 10. The direction of rotation, forward or reverse, is indicated via line 23.

The resulting switching pulse is applied from circuit 22 via line 24 to the motor drive amplifier 26. Circuit 22 switches one of the motor windings pertaining to a particular phase off during each step. The width of the motor drive pulse applied on line 28 from the pulse width modulator 30 is maintained at near minimum, as it will follow from further description.

As it has been indicated previously, in accordance with the embodiment of FIG. 2, one phase of the motor 10 is not energized during each step of the rotor. In the course of this description it is referred to that phase as being deenergized. The deenergized phase is utilized to determine whether the rotor has actually stepped after a drive pulse has been applied, as it is described below. By motion of the rotor 12 a voltage pulse is induced in the deenergized stator winding due to back electomagnetic force (EMF). In the presently described embodiment the stepping detector 32 shown in FIG. 1 is implemented by a pulse detector/discriminator 32. The circuit 32 receives via line 31 the induced pulse from the stator of the stepper motor 10, and it examines the magnitude and polarity of that pulse to determine whether it corresponds to a pulse induced by actual rotor movement corresponding to one step. As it has been noted previously, such a pulse may be induced not only by correctly stepping the rotor, but also from various disturbances, such as jerking the rotor back and forth, crosstalk between energized and deenergized windings, or noise induced from within or outside the motor.

The pulse detector/discriminator 32 compares during each cycle of energizing the motor the amplitude and polarity of the pulse induced into the deenergized stator winding with a known correct reference amplitude and polarity which would result from actual rotor movement during each particular step. The correct reference amplitude and polarity for the comparison is derived from the phase driving timing diagram for the particular stepper motor utilized, and it is applied from the switching logic via line 66. When detector 32 determines that the motor is in a proper running condition, it applies an output signal of a first logic level via line 33 to an up-/down current ramper 34. On the other hand, when circuit 32 determines that the induced pulse is incorrect, it assumes that the rotor has stalled, and applies via line 33 an output signal of a second logic level to the up-/down current ramper 34. In response to the signal on line 33 the ramper 34 provides a decreasing or increasing ramp signal on line 36 to a power command adjustment circuit 38. Thus when running condition of the motor is detected by the circuit 32, the ramp signal on line 36 is decreased after each step by a predetermined amount, until a stall condition is detected, in which case the ramp signal is increased stepwise until running condition is detected, and thereafter the operation repeats. Missing an occasional step does not interfere with proper reel operation.

The power command signal adjustment circuit 38 adjusts the magnitude of the ramp signal on line 36 with changing system parameters to optimize system performance, as it will follow from further detailed description. The adjusted ramp signal from circuit 38 is applied as the power command signal via line 44 to the pulse width modulator 30, to control the width of the drive pulse applied therefrom on line 28 to the switching logic circuit 22, as previously described.

Figure 3:
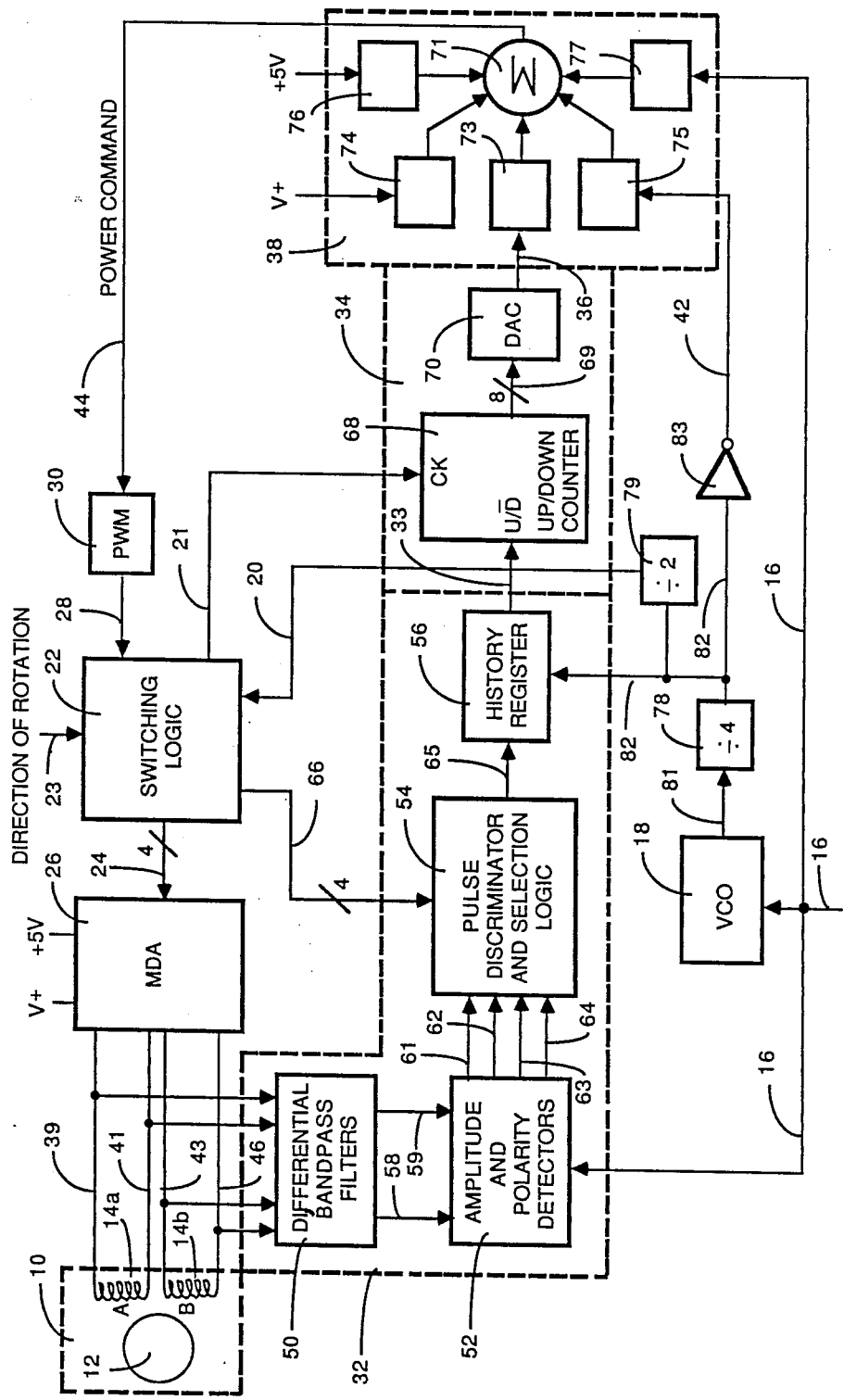
FIG. 3 is a more detailed block diagram showing a two phase stepper motor drive system in accordance with the preferred embodiment of the invention.

Now the preferred embodiment of the invention will be described with reference to a more detailed block diagram shown in FIG. 3. In the system of FIG. 3 a two phase stepper motor 10 is utilized, having a phase A represented by stator winding 14a, and a phase B represented by stator winding 14b. Each stator winding is alternately energized via lines 39, 41 and 43, 46, respectively, by the motor drive amplifier (MDA) 26. As it will become more apparent from the detailed circuit diagram of FIGS. 4A to 4E, when one phase, for example phase 14a is energized during a particular step by applying a drive pulse via lines 39, 41 from MDA 26, the other phase, for example 14b is deenergized, that is, there is no drive pulse applied thereto on lines 43, 46. In response to the drive pulse on lines 39, 41, the rotor steps by one step to assume the next null position. By the relative motion of the rotor with respect to the deenergized stator winding 14b, a voltage pulse is induced into that winding 14b. That induced pulse is applied via lines 43, 46 to the previously described pulse detector/discriminator circuit 32.

In the preferred embodiment of FIG. 3 the circuit 32 comprises differential bandpass filters 50, amplitude and polarity detectors 52, a pulse discriminator and selection logic circuit 54, and a history register 56. The differential band pass filters 50 are conventional filters utilized to filter out undesired noise spikes from the voltage pulses induced into the deenergized windings 14a, 14b, respectively, and to amplify these pulses. The thusly filtered and amplified pulse for each phase is applied from filters 50 via line 58 or 59 to the amplitude and polarity detectors 52. The detectors 52 compare the amplitude of each received pulse with predetermined amplitude limits for a positive and a negative pulse, which limits are further referred to as a window. When the amplitude of a received pulse is inside the window, circuit 52 detects it as a zero amplitude pulse. When a received pulse exceeds the positive amplitude limit set by the window, a positive pulse is detected by the circuit 52. Similarly, when the amplitude of a received pulse on line 58 or 59 exceeds the limit set by the window for a negative pulse, a negative pulse is detected. The circuit 52 has four output lines, of which lines 61, 62 are utilized for phase A and lines 63, 64 for phase B, respectively. Thus an output signal on line 61 indicates that a negative pulse across phase A has been detected; a signal on line 62 indicates a positive pulse across phase A; a signal on line 63 indicates a negative pulse across phase B; and a signal on line 64 indicates a positive pulse across phase B. When a zero amplitude phase is detected by circuit 52, that circuit 52 does not apply any output pulse on any of these lines.

The signals on the respective lines 61 to 64 are applied as logic high or low level pulses, respectively, to the pulse discriminator and selection logic circuit 54. Circuit 54 receives only the first pulse from any sequence of pulses which may be applied thereto on any of these four input lines, while it eliminates any pulses following the first pulse on the same line. The foregoing feature is useful for eliminating from consideration false pulses for example originating from ringing or other type of noise, induced into the deenergized winding. The circuit 54 also receives on line 66 information from the switching logic 22 indicating which phase of the motor is presently being energized, and the correct polarity of the pulse induced into the deenergized winding which would result from actually stepping the rotor. Circuit 54 compares the information obtained on lines 61 to 64 with the information on line 66, and it provides an output pulse on line 65 of one logic level, for example a high level pulse, when comparison is obtained, and of a second logic level, for example a low level pulse when comparison is not obtained.

The history register 56 receives and stores a predetermined number of consecutive pulses applied thereto via line 65. In the preferred embodiment eight consecutive pulses are stored in the register 56. When all the stored pulses are high level pulses, that is, they indicate that eight consecutive comparisons have been obtained, the output signal on line 33 from the register 56 causes an up/down counter 68 to count down, until one of the pulses stored in the register 56 will indicate that a comparison has not been obtained by circuit 54. As a result, the logic level of the output signal on line 33 changes, and causes the counter 68 to count up during the next eight or more consecutive steps, until all the pulses present in the register 56 will again indicate comparison, at which time the counter 68 will start to count down again. By utilizing more than one consecutive pulse resulting from the comparison, to determine the condition of the motor, false indications of running condition resulting from various disturbances are eliminated from consideration. As it has been mentioned previously, only a very few false pulse indications in a row will occur because of the switching of the of the driving pulse after each step, in accordance with the phase driving timing diagram.

It is noted that in the presently described embodiment there are 60 steps per revolution of the stepper motor. Therefore, when considering a gear reduction ratio of 1:20, the eight or more consecutive steps during which there is no drive power applied to the motor do not cause a substantial perturbance to the relatively slowly moving gear.

The up/down counter 56 and following digital-to-analog converter (DAC) 70 together correspond to the previously described up/down current ramper 34 of FIG. 2. The resulting ramp signal from the counter 68 on line 69 is converted into an analog signal by the DAC 70, and the resulting analog ramp signal therefrom is applied via line 36 to the previously described power command signal adjustment circuit 38.

In the preferred embodiment circuit 38 is utilized to adjust the ramp signal on line 36 and apply the adjusted signal to the pulse width modulator 30 via line 44, as the previously described power command signal. By the adjustment of the power command signal the performance of the motor drive system of the invention is optimized, as it will become more apparent from further description.

The VCO 18 increases or decreases its output signal frequency, in response to the motor speed command signal on line 16, as previously described. The output signal from the VCO 18 is applied via line 81 to a frequency divider by four 78. The frequency divided signal therefrom is applied via line 82 as a clock signal to the history register 56. The signal on line 82 is also applied to a frequency divider by two 79, and therefrom via line 20 as a clock signal to the switching logic circuit 22. In addition, the signal on line 82 is inverted via inverter 83 and the inverted signal is applied to the adjustment circuit 38.

The motor speed command on line 16 is also applied to the amplitude and polarity detectors 52, as well as to the power command signal adjustment circuit 38. Because of the well known inductive characteristics of the motor windings combined with the characteristics of the differential bandpass filter 50 shown in FIG. 3 cause the characteristics of the output waveform from filter 50 on lines 58, 59 to change with motor speed, it is necessary to adjust the window thresholds with the changing motor speed. In the preferred embodiment the detectors 52 adjust the previously described amplitude limits defining the size of the window with a changing motor speed command as follows. With an increasing motor speed command signal on line 16 the window size is decreased. Analogously, at decreasing motor speed command signal the window size is adjusted to be larger.

In order to further optimize circuit performance, in the preferred embodiment the following signals are applied to a summing circuit 71 utilized in the power command signal adjustment circuit. The output signal from the D/A converter on line 36 is applied via element 73; the power supply voltage (+V) is applied via element 74; the +5 Volt supply voltage is applied via element 76; the VCO output voltage on line 42 is applied via element 75; and the motor speed command signal on line 16 is applied via element 77. All the above indicated signals are summed by the summing circuit 71, and the resulting summed signal on line 44 is offset with respect to the signal on line 36 from the D/A converter 70. The respective elements 73 to 77 are preferably implemented by resistors which are initially set for the particular stepping motor and motor controller utilized to optimize performance. When the operating conditions change in time, for example the supply voltage increases or decreases, or the motor speed command changes, the offset of the power command signal on line 44 changes accordingly, thereby adjusting the operating range of the PWM 30 to these changes. The signal on line 42 applied to the adjustment circuit 38 is utilized to profile the power command signal on line 44 over the period of one drive pulse, to maximize utilization of the power signal applied to the motor. It is seen from the foregoing description that the adjustment circuit 38 serves to adapt the system of FIG. 3 to the changing system parameters, and to profile the power command signal, thereby optimizing system performance.

The operation of the preferred embodiment of the invention will become more apparent from the following description with reference to the detailed circuit diagram of FIGS. 4A to 4E. These Figures show consecutive portions of a detailed schematic diagram corresponding to the above described block diagram of FIG. 3. Portions of the detailed schematic diagram corresponding to particular blocks in FIG. 3 are enclosed by dashed lines and designated by like reference numerals to facilitate comparison.

Figure 4A:
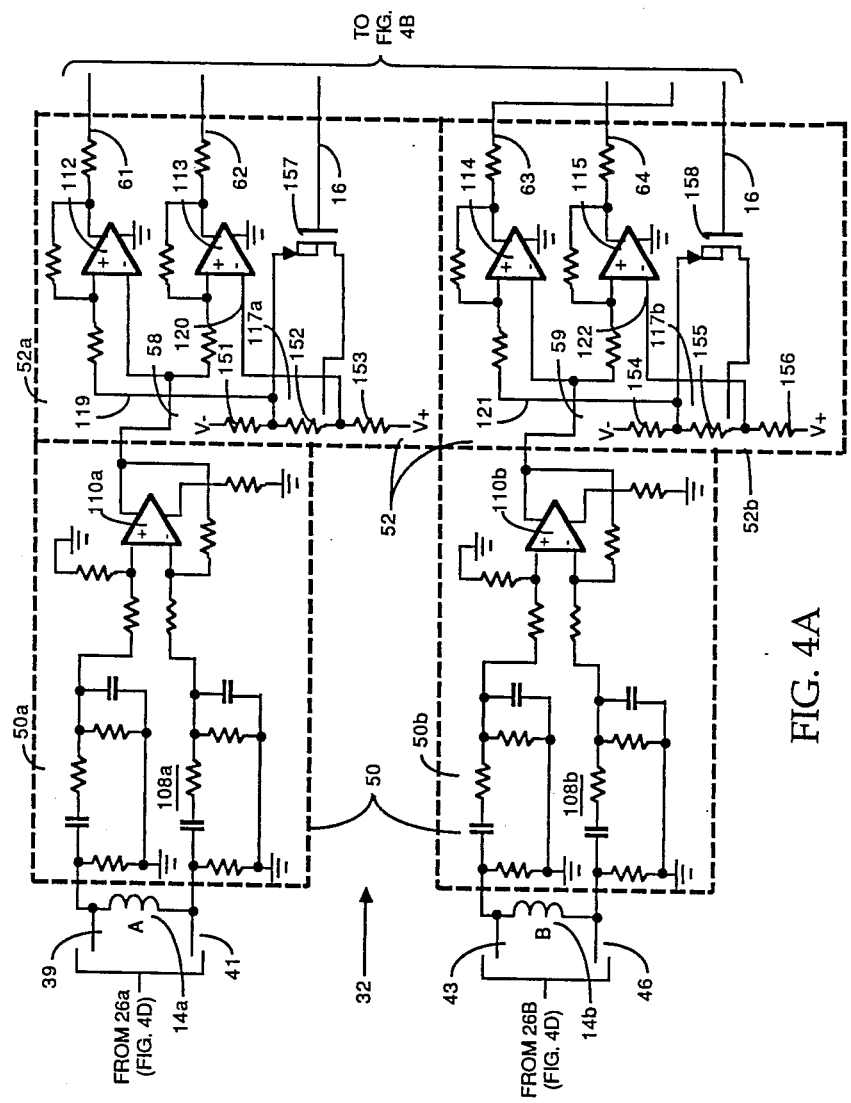
FIGS. 4A to 4E are consecutive portions of a detailed circuit diagram corresponding to FIG. 3.

With further reference to FIG. 4A, it shows the phases A, B, represented by stator windings 14a, 14b, of the two phase stepper motor 10 of FIG. 3. Each phase is connected via lines 39, 41 and 43, 46, respectively to one portion 26a, 26b of the motor drive amplifier 26 shown in FIG. 4D, respectively. Each phase 14a, 14b is also connected to a differential bandpass-filter 50a, 50b, shown in FIG. 4A, utilized to filter out noise from the induced pulse. Each differential bandpass filter comprises a bandpass filter 108a, 108b, followed by a differential amplifier 110a, 110b. The output of each differential bandpass filter 50a, 50b is connected via line 58, 59, respectively, to an amplitude and polarity detector 52a, 52b. Each detector has two voltage comparators 112, 113, and 114, 115, respectively. Comparators 112, 113 receive at one input the signal on line 58, and amplifiers 114, 115 receive at one input the signal on line 59. The other inputs of each pair of comparators receive respective reference voltage values via lines 119 to 122 from voltage dividers 117a, 117b. These reference voltages determine the respective amplitude limits corresponding to the previously described window sizes utilized for comparison with positive and negative signals received on lines 58, 59. Thus, for example when the signal on line 58 is more negative than the reference voltage on line 119, the voltage comparator 112 outputs a logic high level signal on line 61, otherwise line 61 remains at a low logic level. Similarly, when the signal on line 58 is more positive than the reference voltage on line 120, the voltage comparator 113 outputs a logic high level signal on line 62, otherwise line 62 is at a low logic level. The operation of the amplitude and polarity detector 52b is analogous to that of 52a and therefore the description thereof will not be repeated.

It is desirable to adjust the size of the window utilized for the pulse comparison, with the changing step rate of the motor, as it has been previously indicated. In the preferred embodiment the window size which is determined by the voltage dividers 117a, 117b, is changed by the motor speed command signal applied on line 16 as follows. Each voltage divider has three series resistors 151 to 153, and 154 to 156, respectively, connected between a positive and a negative pole of a DC voltage source. The middle resistor 152, 155 of each divider is connected to a FET 157, 158 respectively, utilized as a voltage controlled resistor. The gate of each FET is connected to the motor speed command line 16. With increasing or decreasing motor speed the voltage on line 16 increases or decreases, thereby decreasing or increasing the resistance provided by the FET and as a result, increasing or decreasing the window size.

Figure 4B:
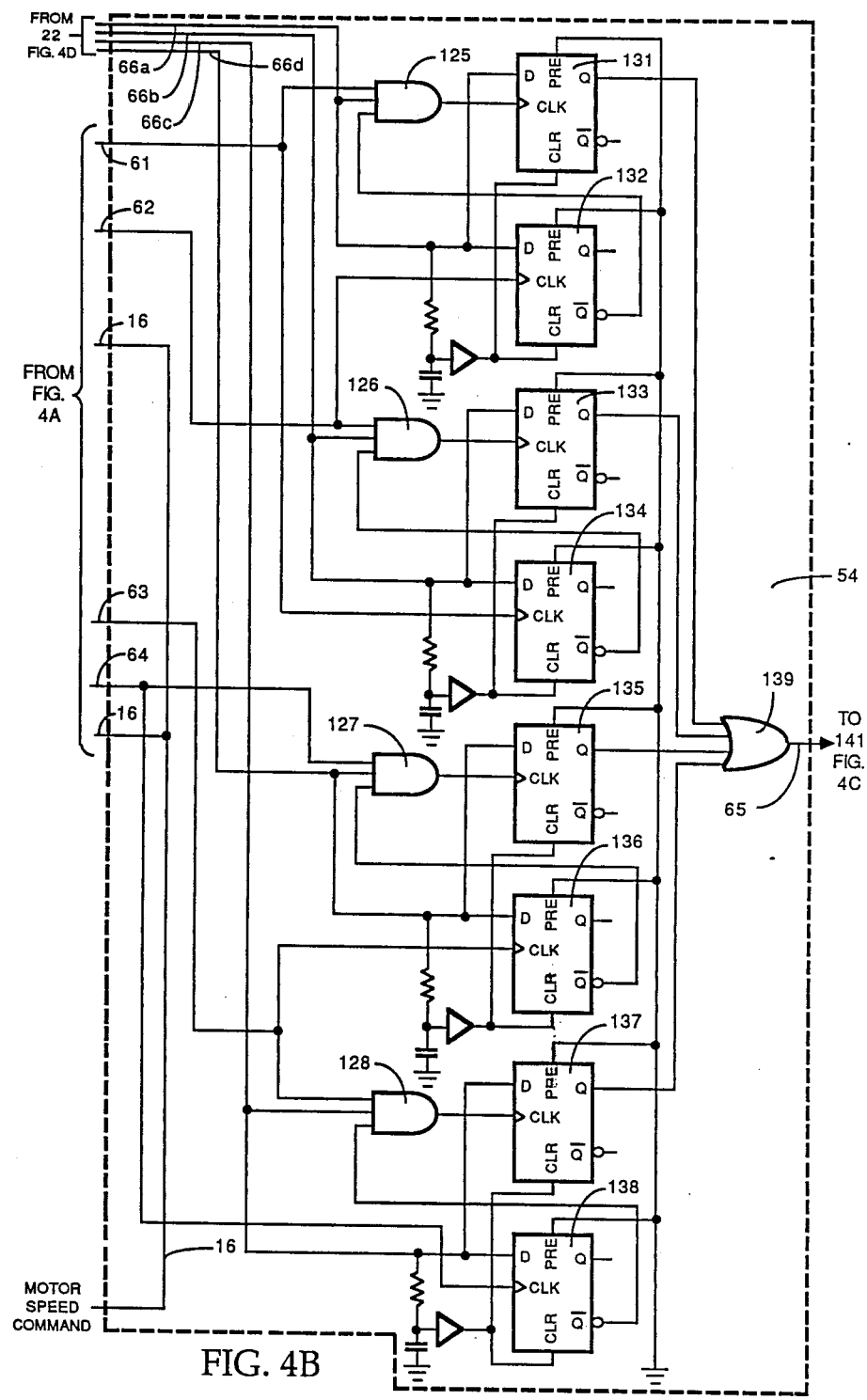

With further reference to FIG. 4B, the pulse discriminator and selection logic circuit 54 comprises AND gates 125 to 128, first flip-flops 131, 133, 135 and 137, and second flip-flops 132, 134, 136 and 138. Each AND gate has one input connected to one of the lines 61 to 64, and a second input to one of the lines 66a to 66d. As it has been previously described, the signal on each line 66a to 66d indicates when a particular phase of the motor is being energized at a predetermined polarity at any given time during operation. Thus only one of the lines 66a to 66d applies a logic high signal to the particular AND gate connected thereto, while the other AND gates receive low logic signals from the other lines. Each AND gate is connected to one first and one second flip-flop as follows. The output of each particular AND gate is connected to the clock input of a first flip-flop. The D-inputs of each first and second flip-flop are connected to a second input of that AND gate and thus receive the signal on the corresponding line 66a to 66d, applied to that AND gate. Prior to receiving a pulse via lines 61 to 64 each AND gate has a logic high level signal applied to its third input from the particular second flip-flop 132, 134, 136 or 138, connected thereto, respectively.

Thus, for example a pulse applied from the amplitude and polarity detector 52 shown on FIG. 4A, on line 61 will be gated through AND gate 125 only during a particular time when that gate is enabled via line 66a and when that pulse has a logic high level. The output signal from each AND gate 125 to 128 is clocked through the particular first flip-flop 131, 133, 135, 137, associated with that gate, to a respective input of an OR-gate 139. The output 65 of the OR gate corresponds to the output of the pulse discriminator and selection logic circuit 54. It follows from the foregoing description that gate 139 applies to line 65 one pulse at a time, each pulse having logic high level when all three inputs of a particular AND gate simultaneously receive a logic high level signal.

To eliminate false pulses which may be induced into the deenergized motor winding, from gating through a particular AND gate, after receiving a first pulse from the output of the AND gate, the second flip-flop disables that AND gate, and any subsequent pulses following the first pulse will not be gated therethrough. As it has been described previously, such pulses may be induced at a correct polarity indicating that the motor has actually stepped, but may result from ringing, or other disturbing effects, and thus cause false indication of proper motor movement.

Figure 4C:
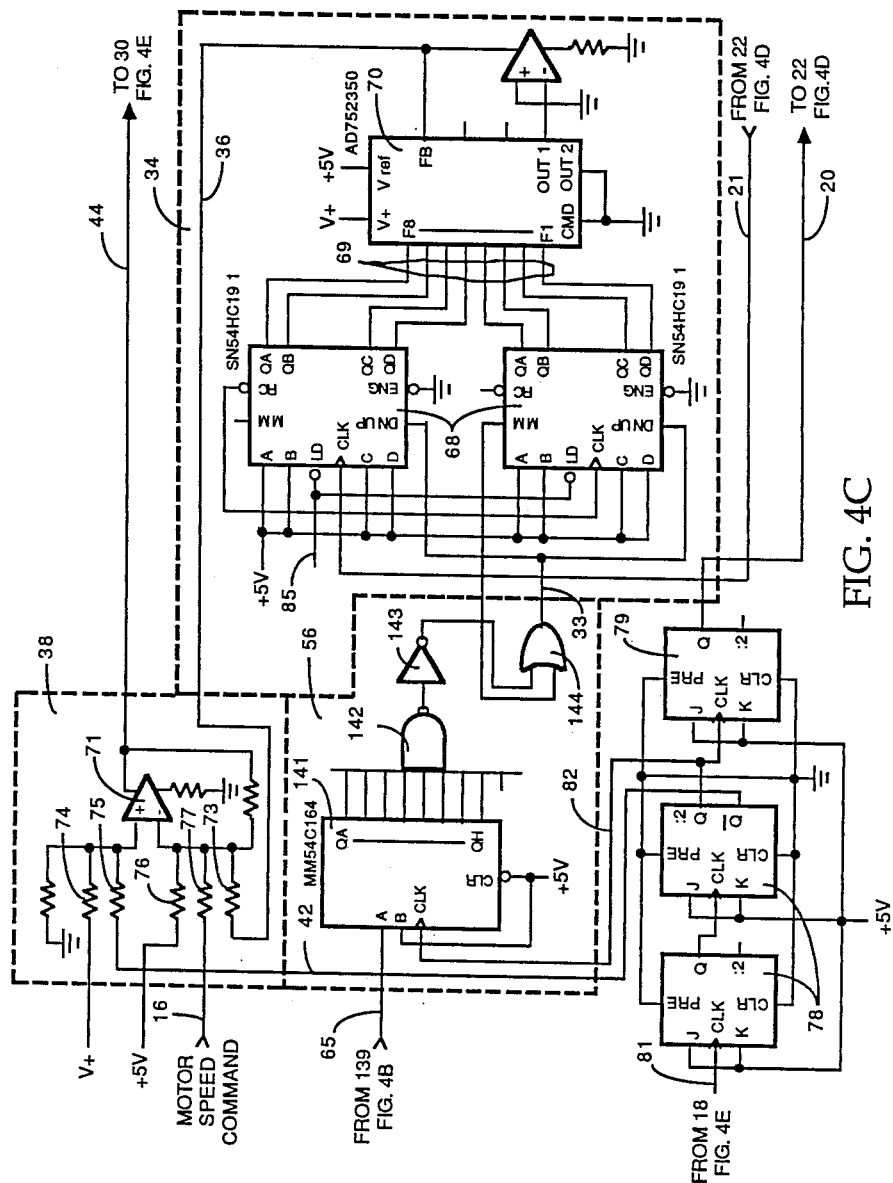

The thusly gated pulses from OR gate 139 are applied via line 65 to the history register 56, shown in FIG. 4C. The history register comprises an 8 bit serial shift register 141, NAND gate 142, inverter 143, and OR gate 144. The pulses on line 65 are clocked into the shift register by the clock signal on line 82. The shift register stores 8 consecutive pulses clocked therein, which pulses are gated in parallel through the NAND gate 142. Consequently, gate 142 provides an output pulse of a first logic level only when all the stored pulses in the shift register indicate that the motor has correctly stepped during the last eight consecutive steps. If one or more pulses in the shift register indicate that the motor has not stepped correctly, the gate 142 outputs a pulse having a second logic level. The output pulse from the gate 142 is applied through inverter 143, OR gate 144 and line 33 to increment or decrement a previously described up/down counter 68. Thus the output of NAND gate 142 determines the direction of count provided by the counter 68. When power is turned on, the counter 68 is initialized via line 85 to maximum count to guarantee a starting operating condition. The output signal from the counter 68 is applied as an 8-bit signal to a digital-to-analog converter 70, which applies a corresponding increasing or decreasing ramp signal on line 36. As it has been previously described, that ramp signal controls the duty cycle of the pulse width modulator 30, which in turn controls the magnitude of the drive power applied to energize the stepper motor windings.

With further reference to FIG. 4C, the summing circuit 71 of the previously described power command signal adjustment circuit 38 comprises a summing operational amplifier having an inverting and a non inverting input. The non-inverting input receives the previously described signals via resistors 74 and 75. The inverting input of the amplifier 71 receives the previously described signals via resistors 73, 76, and 77. Thus in the preferred embodiment, the signals applied via resistors 74 and 75 are added to the ramp signal on line 36 applied via resistor 73, while the signals applied via resistors 76 and 77 are subtracted therefrom. The resulting output signal from the summing amplifier 71 corresponds to the previously described power command signal on line 44, which is offset by these various signals applied to the adjustment circuit 38. The thusly offset power command signal is applied via line 44 to the pulse width modulator 30 shown in FIG. 4E, thereby adjusting the width of the motor drive pulse provided thereby to optimize circuit performance.

Figure 4D:
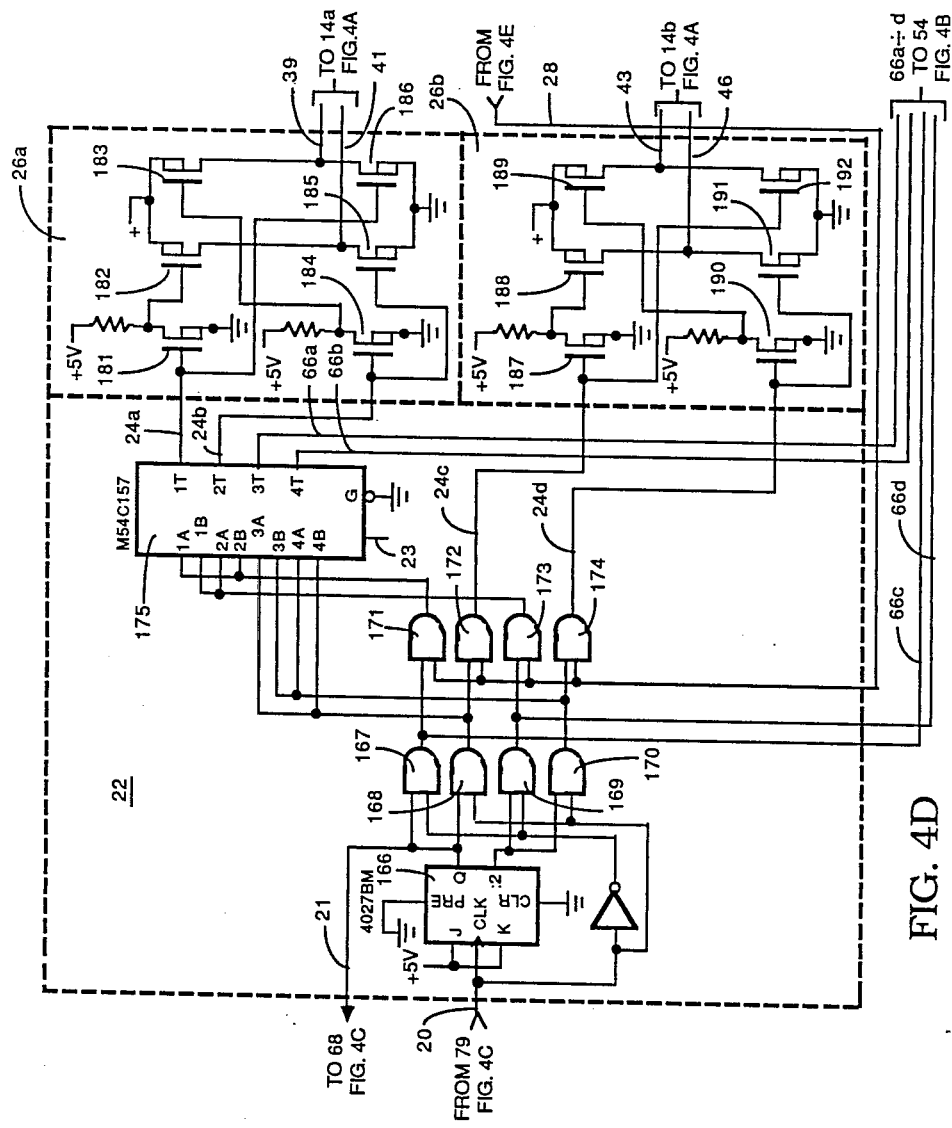
Figure 4E:
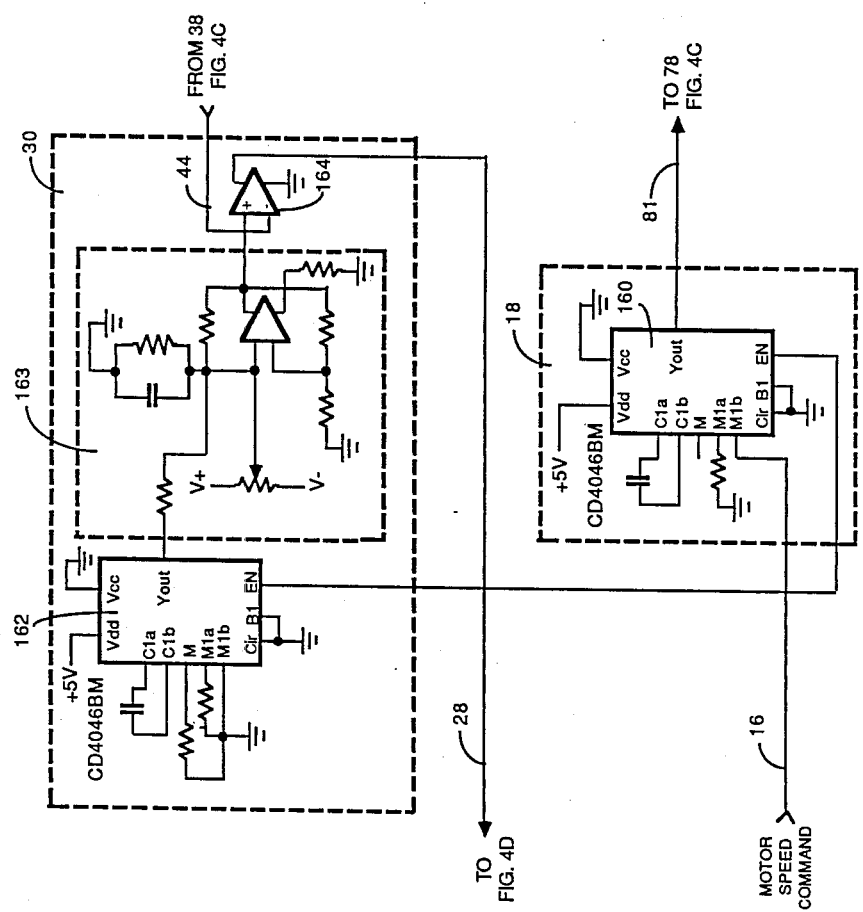

FIG. 4D shows a detailed circuit diagram of the switching logic 22 and MDA 26 circuits, and FIG. 4E shows the VCO 18 and PWM 30 circuits, corresponding to the previously described block diagram of FIG. 3. VCO 18 is implemented by a clock signal generator 160. PWM 30 is implemented by a square wave clock signal generator 162, followed by an integrator 163, which is utilized to generate a triangular waveform from the square wave signal. A voltage comparator 164 compares an output signal from the integrator 163 applied to one input, with the previously described ramp signal on line 44, applied to its other input. The changing signal amplitude of the ramp signal on line 44 causes to change the threshold for comparison, thereby modulating the width of the output pulses from the pulse width modulator 30 on line 28, in accordance with the well known operation of conventional pulse width modulators.

The switching logic circuit 22 shown in FIG. 4D has a frequency divider by two 166, four first AND gates 167 to 170, four second AND gates 171 to 174, and a multiplexer 175. The frequency divider 166 receives from frequency divider 79 of FIG. 4C the frequency divided signal by eight on line 20, generated by the VCO 18. AND gates 168, 170 receive the non-inverted signal on line 20, while AND gates 167, 169 receive the inverted signal on line 20. In addition, AND gates 167, 168 receive a non-inverted output signal from the divider 166, while AND gates 169, 170 receive an inverted output signal from the divider 166. The first AND gates 167 to 170 generate switching pulses for switching on/off the respective phases 14a, 14b of the motor, in accordance with a phase driving timing diagram of the two phase motor utilized. Each first AND gate has its output connected to one input of a second AND gate, while all the second AND gates have their second inputs connected to line 28. As it has been previously described, the signal on line 28 corresponds to the output pulses from the pulse width modulator 30.

The multiplexer 175 receives the output signals from AND gates 168, 170, 171, and 173, and the direction control signal on line 23, indicating a forward or reverse direction of motor movement. The multiplexer 175 is utilized to reverse the logic level of the output signals applied therefrom on lines 24a, 24b, and 66a, 66b in response to a change in the direction of motor movement indicated on line 23. The output signal on lines 24a, 24b from the multiplexer 175 is applied to a portion 26a of the MDA 26, which portion is utilized to drive the windings 14a, corresponding to phase A of the motor. The output signal from AND gates 172, 174 on lines 24c, 24d is applied to a portion 26b of the MDA 26, utilized to drive windings 14b, corresponding to phase B.

Each circuit portion 26a, 26b comprises six FET switches 181 to 186, 187 to 192, respectively. It follows from the foregoing description that the motor driving pulses received on line 28 are applied by the switching logic circuit 22 via lines 24a to 24d to respective portions 26a, 26b of the motor drive amplifier at a desired polarity and in proper sequence, in accordance with the particular phase driving timing diagram associated with the particular motor utilized. As an example, these driving pulses are applied from circuit 22 via one of the lines 24a to 24d at a time, and via the FET switches, to the respective stepper motor windings 14a, 14b, as follows. When the signal level on line 24a is high, the FET switches 181, 182, and 186 will conduct, while all the other switches will be off. As a result, winding 14a will have a positive driving pulse applied thereto. During a next step the signal on line 24c is high, causing switches 187, 188, 192 to conduct, thereby applying a positive pulse to winding 14b. During a next step, a high signal on line 24b activates FET switches 183, 184, and 185, which in turn apply a negative driving pulse to winding 14a. During a further step the signal on line 24d becomes high, causes switches 189, 190, and 191 to conduct, and to apply a negative pulse to winding 14b. Thereafter a high signal level is applied to the line 24a, and the above described cycle repeats. It will be understood by those skilled in the art that the order in which positive and negative pulses are applied to the respective windings of a particular stepper motor to obtain forward or reverse movement is determined by a particular phase driving timing diagram pertaining to a particular motor utilized.

Although the invention has been described in terms of the various embodiments detailed herein, those skilled in the art will appreciate other embodiments which will accomplish the same results substantially in the same manner. All such embodiments are intended to be within the scope of the claims appended thereto.

What is claimed is:

1. A stepper motor drive system, comprising:
   a stepper motor having a rotor, and a plurality of windings corresponding to a plurality of motor phases;
   first means for providing a drive power and applying said drive power to said windings to step said rotor, said first means maintaining a different one of said windings deenergized during each step;
   second means comprising a stepping detector means for detecting a pulse induced into said deenergized winding by stepping said rotor, and comparing an amplitude and polarity of each said detected pulse to a reference amplitude and polarity resulting from stepping said motor in a desired direction of rotation, said stepping detector means being coupled to provide an output signal of a first logic level when said amplitude and polarity of said received pulse both correspond to said reference, and an output signal of a second logic level when at least one of said amplitude and polarity does not correspond to said reference; and
   third means for receiving said output signal and applying a first control signal to said first means for decreasing said drive power provided by said first means in response to a said first logic level, and for increasing said drive power in response to said second logic level.

2. The system of claim 1, wherein said first means comprises:
   drive pulse generator means for receiving said first control signal and providing drive pulses having a width corresponding to a desired drive power;
   switching logic means having a first input coupled to receive said drive pulses provided by said drive generator means, a second input coupled to receive a signal corresponding to a desired frequency of stepping said motor, and a third input coupled to receive a second control signal indicating a desired direction of rotation of said motor, said switching logic means coupled to apply said drive pulses at a desired polarity and at said desired frequency of stepping, said switching logic circuit being further coupled to inhibit application of said drive pulses to a respective deenergized winding during each step;

motor drive amplifier means coupled to receive said drive pulses from said switching logic means, and to apply a power signal to energize said respective windings in response to said drive pulses; and a voltage controlled oscillator means having a control input coupled to receive a signal indicating a desired speed of rotation of said motor, and an output coupled to said second input of said switching logic means, said output coupled to provide said output signal having a frequency corresponding to said desired frequency of stepping said motor, in response to said desired speed of rotation.

3. The system of claim 1 wherein said stepping detector means comprises amplitude and polarity detector means receiving said detected pulse induced into each said deenergized winding, respectively, and comparing said amplitude of each received pulse with a predetermined positive and negative reference amplitude, and providing a second control signal when said amplitude is equal to or exceeds said positive reference amplitude, and a third control signal when said amplitude is equal to or exceeds said negative reference amplitude.

4. The system of claim 3 wherein said stepping detector means further comprises pulse discriminator and selection logic means for receiving one of said second and third control signals, respectively, and a reference signal from said first means indicating a correct polarity of said induced pulse resulting from actually stepping said motor, and for comparing after each step an earliest received one of said second and third control signals with said reference signal, and wherein said pulse discriminator and selection logic means provides an output signal of a first logic level when said compared signals correspond to each other, and of a second logic level, when said compared signals do not correspond to each other.

5. The system of claim 4, wherein said stepping detector means further comprises a history register means for storing a predetermined number of consecutive logic signal levels provided by said pulse discriminator and selection logic means, and for providing a first logic level output signal when all the stored signal levels indicate stepping in a desired direction, and a second logic level output signal, when at least one of said stored signal levels does not indicate stepping in a desired direction.

6. The system of claim 5, wherein said third means comprises an up/down signal ramping means for receiving said output signal from said history register means and providing a substantially linearly decreasing ramp signal in response to said first logic level output signal, and a substantially linearly increasing ramp signal in response to said second logic level output signal, and applying said ramp signal corresponding to said first control signal, to said first means.

7. The system of claim 6, further comprising a first control signal adjustment circuit coupled in a first control signal path to provide an offset of said first control signal in response to a change in a power voltage supplied to said system.

8. The system of claim 7 wherein said first control signal adjustment circuit comprises a summing means coupled to receive and sum respective signals proportional to said first control signal and to said power voltage.

9. The system of claim 6, further comprising a first control signal adjustment circuit coupled in a first control signal path to provide an offset of said first control signal in response to a change in a speed of rotation of said motor.

10. The system of claim 9 wherein said first control signal adjustment circuit comprises summing means coupled to receive and sum respective signals proportional to said first control signal and to a signal indicating said speed of rotation.

11. The system of claim 1, wherein said amplitude and polarity detector and pulse discriminator and selection logic means is further coupled to receive a motor speed command signal, indicating a desired speed of rotation of said motor, and to change said reference amplitude in response to a change in said desired speed of rotation.

12. The system of claim 6, wherein said first means comprises a pulse width modulator means, and wherein said ramp signal provided by said up/down signal ramping means is coupled to control a duty cycle of said pulse width modulator means.

13. The system of claim 12, wherein said up/down signal ramping means comprises an up/down binary counter means and a digital-to-analog converter means having an input coupled to an output of said up/down binary counter means.

14. The system of claim 2, further comprising a voltage controlled oscillator means having a control input coupled to receive a signal indicating a desired speed of rotation of said motor, and an output coupled to said second input of said switching logic means, said output coupled to provide said output signal having a frequency corresponding to said desired frequency of stepping said motor, in response to said desired speed of rotation.

15. A stepper motor drive system, comprising;
 a stepper motor having a rotor, and a plurality of windings corresponding to a plurality of motor phases;
 means for providing a drive power and applying said drive power to said windings to step said rotor, said means maintaining a different one of said windings deenergized during each step;
 an amplitude and polarity detector and pulse discriminator and selection logic means for detecting a pulse induced into said deenergized winding, and comparing an amplitude and polarity of said detected pulse to a reference amplitude and polarity resulting from stepping said motor in a desired direction of rotation, and for responsively providing an output signal of a first logic level when said amplitude and polarity of said received pulse both correspond to said reference, and an output pulse of a second logic level when at least one of said amplitude and polarity does not correspond to said reference;
 an up/down signal ramping means coupled to receive said output signal and to provide a substantially linearly decreasing ramp signal in response to an output signal of said first logic level, and a substantially linearly increasing ramp signal in response to an output signal of said second logic level, and to apply said ramp signal to said means for providing said drive power.

16. A stepper motor drive system, comprising:

a stepper motor having a rotor, and a plurality of windings corresponding to a plurality of motor phases;

means for providing a drive power and applying said drive power to said windings to step said rotor, said means maintaining a different one of said windings deenergized during each step;

an amplitude and polarity detector and pulse discriminator and pulse discriminator and selection logic means for detecting a pulse induced into said deenergized winding, and comparing an amplitude and polarity of said detected pulse to a reference amplitude and polarity resulting from stepping said motor in a desired direction of rotation, and for responsively providing an output signal of a first logic level when said amplitude and polarity of said received pulse both correspond to said reference, and an output pulse of a second logic level when at least one of said amplitude and polarity does not correspond to said reference;

a history register means for receiving and storing a predetermined number of consecutive output signals of said first and second level and providing an output signal of a first logic level when all the stored signal levels indicate stepping in a desired direction, and an output signal of a second logic level, when at least one of said stored logic levels does not indicate stepping in a desired direction; and an up/down signal ramping means coupled to receive said output signal from said history register means and to provide a substantially linearly decreasing ramp signal in response to said received first logic level signal, and a substantially linearly increasing ramp signal in response to said received second logic level and to apply said ramp signal to said means for providing said drive power.

* * * * *